(12) United States Patent
Xia et al.

(10) Patent No.: US 8,270,317 B2
(45) Date of Patent: *Sep. 18, 2012

(54) METHOD AND APPARATUS FOR ADVERTISING BORDER CONNECTION INFORMATION OF AUTONOMOUS SYSTEM

(75) Inventors: Hongmiao Xia, Shenzhen (CN); Renhai Zhang, Shenzhen (CN); Guoyi Chen, Shenzhen (CN); Xingfeng Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

This patent is subject to a terminal disclaimer.

(21) Appl. No.: 12/463,218

(22) Filed: May 8, 2009

(65) Prior Publication Data

US 2009/0274159 A1    Nov. 5, 2009

Related U.S. Application Data

(63) Continuation of application No. PCT/CN2007/070679, filed on Sep. 12, 2007.

(30) Foreign Application Priority Data

Nov. 9, 2006 (CN) .......................... 2006 1 0063572
Nov. 10, 2006 (CN) .......................... 2006 1 0156815

(51) Int. Cl.
  *H04L 12/28* (2006.01)
(52) U.S. Cl. ......................................... 370/254; 370/389
(58) Field of Classification Search .................... None
  See application file for complete search history.

(56) References Cited

U.S. PATENT DOCUMENTS 5,680,116 A * 10/1997 Hashimoto et al. ........... 370/254
6,173,324 B1 * 1/2001 D'Souza ....................... 709/224
6,718,396 B1    4/2004 Maejima et al.
6,754,219 B1 * 6/2004 Cain et al. ..................... 370/401
6,801,496 B1   10/2004 Saleh et al.
7,076,559 B1    7/2006 Ghanwani et al.
7,180,864 B2    2/2007 Basu et al.
7,468,956 B1 * 12/2008 Leelanivas et al. ........... 370/255

(Continued)

FOREIGN PATENT DOCUMENTS

CN          1761244         4/2006

(Continued)

OTHER PUBLICATIONS

Katz et al, TE Extensions to OSPF V2 (RFC 3630), Sep. 2003, IETF, pp. 1-15.*

(Continued)

*Primary Examiner* — Gary Mui
*Assistant Examiner* — Hicham Foud
(74) *Attorney, Agent, or Firm* — Conley Rose, P.C.; Grant Rodolph (57) ABSTRACT

A method and an apparatus for advertising border connection information of autonomous system are disclosed. Moreover, the method includes: establishing and maintaining, by a border node of the autonomous system, the border connection information of the autonomous system; flooding the border connection information within the autonomous system; and receiving, by nodes of the autonomous system, the border connection information. The method and the apparatus for advertising border connection information of autonomous system of embodiments of the present invention may adapt to dynamic change of network topology, and dynamically advertise the border connection information of the autonomous system within the system in time, so as to optimize networks and improve quality of service of the networks.

15 Claims, 4 Drawing Sheets

U.S. PATENT DOCUMENTS

| | | | |
|---|---|---|---|
| 7,626,948 B1 | 12/2009 | Cook et al. | |
| 7,702,765 B1 | 4/2010 | Raszuk | |
| 2003/0012179 A1 | 1/2003 | Yano et al. | |
| 2003/0072270 A1* | 4/2003 | Guerin et al. | 370/254 |
| 2003/0137974 A1 | 7/2003 | Kwan et al. | |
| 2003/0231633 A1* | 12/2003 | Aramizu et al. | 370/395.31 |
| 2004/0081154 A1 | 4/2004 | Kouvelas | |
| 2006/0023743 A1* | 2/2006 | Brown et al. | 370/466 |
| 2006/0114916 A1 | 6/2006 | Vasseur et al. | |
| 2006/0133298 A1* | 6/2006 | Ng et al. | 370/254 |
| 2006/0140136 A1* | 6/2006 | Filsfils et al. | 370/255 |
| 2006/0153200 A1 | 7/2006 | Filsfils et al. | |
| 2006/0200579 A1 | 9/2006 | Vasseur et al. | |
| 2006/0227723 A1* | 10/2006 | Vasseur et al. | 370/254 |
| 2006/0256711 A1* | 11/2006 | Kusama et al. | 370/216 |
| 2007/0002729 A1* | 1/2007 | Engel | 370/216 |
| 2007/0019565 A1 | 1/2007 | Ishikawa | |
| 2007/0019673 A1 | 1/2007 | Ward et al. | |
| 2007/0058606 A1* | 3/2007 | Koskelainen | 370/351 |
| 2007/0091793 A1 | 4/2007 | Filsfils et al. | |
| 2007/0091795 A1* | 4/2007 | Bonaventure et al. | 370/228 |
| 2007/0214275 A1* | 9/2007 | Mirtorabi et al. | 709/230 |
| 2008/0062986 A1 | 3/2008 | Shand et al. | |
| 2010/0074101 A1* | 3/2010 | Skalecki et al. | 370/221 |
| 2010/0118740 A1* | 5/2010 | Takacs et al. | 370/256 |
| 2010/0221003 A1* | 9/2010 | Bernstein et al. | 398/48 |

FOREIGN PATENT DOCUMENTS

| | | |
|---|---|---|
| WO | 03/049342 A2 | 6/2003 |
| WO | 2006060184 A2 | 6/2006 |
| WO | WO-2006071901 | 7/2006 |
| WO | 2006110357 A2 | 10/2006 |

OTHER PUBLICATIONS

Rekhter et al, BGP-4 (RFC 1771), Mar. 1995, IETF, pp. 1-47.*

Smit et al, ISIS (RFC 3784), Jun. 2004, IETF, pp. 1-13.*

Moy, OSPF V2 (RFC 2328), Apr. 1998, IETF, pp. 1-204.*

English translation of the PCT Written Opinion of the International Searching Authority for International application No. PCT/CN2007/070679, mailed Dec. 13, 2007, 5 pgs.

First Office Action of the State Intellectual Property Office of the PRC, dated Apr. 11, 2008, 6 pgs., English translation attached.

Wenhui, Zhou, et al., "An Interior Gateway Protocol for Internet-OSPF", National Digital Switching System Engineering and Technology Research Center, Computer Engineering, vol. 26., No. 2, dated Feb. 2000, 3 pgs., English translation attached.

Shen, N., "Extensions to OSPF for Advertising Optional Router Capabilities", Network Working Group, Internet-Draft, Nov. 30, 2005, 14 pgs.

Farrel, Adrian, et al., "A Path Computation Element (PCE) Based Architecture", Network Working Group, IETF Internet Draft, Apr. 2006, 37 pgs.

Srisuresh, P. et al., "TE LSAs to extend OSPF for Traffic Engineering"—draft-srisuresh-ospf-te-02.txt; Network Working Group Internet Draft, Jan. 4, 2002, 40 pages.

Rosen, E. et al., "OSPF as the Provider/Customer Edge Protocol for BGP/MPLS IP Virtual Private Networks (VPNs)", Network Working Group RFC 4577, Jun. 2006, 24 pages.

Le Roux, J. et al., "OSPF protocol extensions for Path Computation Element (PCE) Discovery", draft-ietf-pce-disco-proto-ospf-00.txt, Network Working Group Internet Draft, Sep. 2006, 24 pages.

Coltun, R. et al., "OSPF for IPv6", Network Working Group RFC 2740, Dec. 1999, 81 pages.

Moy, J., "OSPF Version 2", Network Working Group RFC 2328, STD: 54, Category—Standards Track, Apr. 1998, 245 pgs.

Vasseur, J. et al., "IS-IS Extensions for Advertising Router Information", draft-ietf-isis-caps-06.txt; Network Working Group Internet Draft, Jan. 2006, 8 pgs.

Le Roux, J. et al., "IS-IS Protocol Extensions for Path Computation Element (PCE) Discovery", draft-ietf-pce-disco-proto-isis-00.txt; Network Working Group Internet Draft, Sep. 2006, 30 pgs.

First Chinese Office Action dated (mailed) Sep. 13, 2010, issued in related Chinese Application No. 200780000353.X Huawei Technologies C., Ltd (4 pages).

Chen, et al., "OSPF Extensions in Support of Inter-AS (G)MPLS TE; draft-chen-ccamp-ospf-interas-te-extension-00.txt," IETF Standard Working Draft, Internet Engineering Task Force, IETF, CH, Jan. 30, 2007.

Zhang et al., "Locate ASBR in PCE; draft-zhang-pce-locate-asbr-00. txt," IETF Standard Working Draft, Internet Engineering Task Forrce, IETF, CH, Oct. 12, 2006.

Vasseur et al., "A Per-domain path computation method for establishing Inter-doman Traffic Engineering (TE) Label Switched Paths (LSPs); draft-ietf-ccamp-inter-domain-pd-path-comp-03.txt," IETF Standard Working Draft, Internet Engineering Task Force, IETF, CH, Aug. 29, 2006.

Moy et al., "OSPF Version 2; rfc2328,txt," IETF Standard, Internet Engineering Task Force, IETF, CH, Apr. 1, 1998.

Foreign communication from a counterpart application, European application 07801087.3, Extended European Search Report dated Oct. 8, 2009, 8 pages.

Foreign Communication From a Related Counterpart Application, Chinese Application 200610063572.X, English Translation of Chinese Office Action of the State Intellectual Property office of the PRC dated Apr. 11, 2008, 8 pages.

Foreign Communication From a Related Counterpart Application, European Application 07801087.3, European office Action dated Dec. 1, 2011, 6 pages.

Wenhui, Zhou, et al., "An Interior Gateway Protocol for Internet-OSPF", English Translation—National Digital Switching System Engineering and Technology Research Center, Computer Engineering, vol. 26, No. 2, dated Feb. 2000, 8 pages.

Office Action dated Feb. 11, 2011, 30 pages, U.S. Appl. No. 12/895,292, filed Sep. 30, 2010.

Office Action dated Apr. 25, 2011, 22 pages, U.S. Appl. No. 12/895,292, filed Sep. 30, 2010.

Office Action dated Aug. 8, 2011, 3 pages, U.S. Appl. No. 12/895,292, filed Sep. 30, 2010.

Office Action dated Sep. 13, 2011, 6 pages, U.S. Appl. No. 12/895,292, filed Sep. 30, 2010.

Office Action dated Oct. 27, 2011, 2 pages, U.S. Appl. No. 12/895,292, filed Sep. 30, 2010.

Notice of Allowance dated Dec. 28, 2011, U.S. Appl. No. 12/895,292, filed Sep. 30, 2010.

* cited by examiner

METHOD AND APPARATUS FOR ADVERTISING BORDER CONNECTION INFORMATION OF AUTONOMOUS SYSTEM

CROSS-REFERENCE TO RELATED APPLICATIONS

This application is a continuation of International Application No. PCT/CN2007/070679, filed on Sep. 12, 2007, which claims the benefit of Chinese Patent Application Nos. 200610063572.X, filed on Nov. 9, 2006, and 200610156815.4, filed on Nov. 10, 2006, all of which are hereby incorporated by reference in their entireties.

FIELD OF THE INVENTION

Embodiments of the present invention relate to technical field of communication, and in particular relate to a method and apparatus for advertising border connection information of Autonomous System (AS).

BACKGROUND

Current network is overburdened, and requires optimization, due to continuous enlargement of network, continuous growth of data traffic and complexity of service. Traffic Engineering (TE) is developed as required, which focuses on optimization of general performance of networks, so as to provide efficient and stable network services, optimize usage of network resources, and optimize network traffic. In terms of difference of functionality ranges, the traffic engineering can be categorized into intra-domain traffic engineering and inter-domain traffic engineering. At present, the intra-domain traffic engineering is relatively mature, the major method thereof is to flood TE information of links in the intra-domain via extension of conventional interior gateway protocol (IGP), such as extension of Open Shortest Path First Traffic Engineering (OSPF-TE), and extension of Intermediate System to Intermediate System Traffic Engineering (ISIS-TE), so as to implement synchronization of intra-domain Traffic Engine Database (TED).

In a typically large network including a plurality of Autonomous Systems, in consideration of extensibility and security, the TE information within each AS cannot be flooded to the outside of the autonomous system. In order to obtain TE path between the autonomous systems, there are mainly two path calculation methods: one method is to utilize a Path Computation Element (PCE) to cooperatively calculate, i.e. within the autonomous systems there is one or more PCEs responsible for the path calculation of the present autonomous system, and the path calculation between the autonomous systems is completed by the PCE cooperation with one or more PCEs of other autonomous systems; another method is to utilize the manner of explicit route to display AS sequence of a specified path or IP address sequence of a specified Autonomous System Border Router (ASBR), and then complete the path calculation among the autonomous systems according to the specified information by a Label Switched Router (LSR). No matter which calculation method is utilized, the Path Computation Element (PCE) or the Label Switched Router (LSR) responsible for TE path calculation needs to know border connection information between the autonomous system located therein and external neighbor autonomous systems. The border connection information refers to information of establishing or deleting connection between Autonomous System Border Router (ASBR) where the path calculating node is located and the external neighbor Autonomous System Border Router (ASBR).

Currently, no solution raises how to advertise border connection information of autonomous systems. The border connection information is statically and manually configured as required by the nodes within the systems. However, the disadvantage of the static and manual configuration lies in that it fails to adapt to dynamic change of network topology, so that it cannot support the TE path calculation between autonomous systems efficiently, and then it is difficult to implement optimization of general performance of networks. When the border connection information of the autonomous systems changes, such as a disconnection between a certain border node and a corresponding neighbor border node in a neighbor autonomous system, if the node responsible for path calculation within the autonomous system obtains the border connection information of the present system via a static and manual configuration method, it always fails to learn abovementioned change of border connection information in time, and executes the path calculation based on the previous information statically configured. The path may be noticed unavailable during the calculating process and need to be re-configured via a manual modification. Additionally, when the border connection relationship of autonomous systems is relatively complex, the static and manual configuration method has problems, such as high workload, time consuming, low processing efficiency and high cost, and wrongmatch or miss-match may easily occur because of human cause.

SUMMARY

Various embodiments of the present invention are directed to providing a method for advertising border connection information of autonomous system and to providing an apparatus for advertising border connection information of autonomous system, in order to adapt to dynamic change of network topology, and dynamically advertise the border connection information of the autonomous system within the system in time.

For these purposes, the solution of embodiments of the present invention is implemented as follows.

An embodiment of the present invention discloses a method for advertising border connection information of autonomous system. The method includes:

establishing and maintaining, by a border node of the autonomous system, the border connection information of the autonomous system;

flooding the border connection information within the autonomous system; and receiving, by nodes of the autonomous system, the border connection information.

An embodiment of the present invention discloses an apparatus for advertising border connection information of autonomous system. The apparatus includes:

a border connection information collecting module, configured to obtain border connection information established by the border node;

a border connection information database, configured to store the border connection information of the autonomous system, the border connection information including the border connection information established by the border node;

a message generating module, configured to package the border connection information established by the border node into a message; and a message advertising module, configured to internally flood the message generated in the message generating module within the autonomous system.

DETAILED DESCRIPTION

Figure 1:
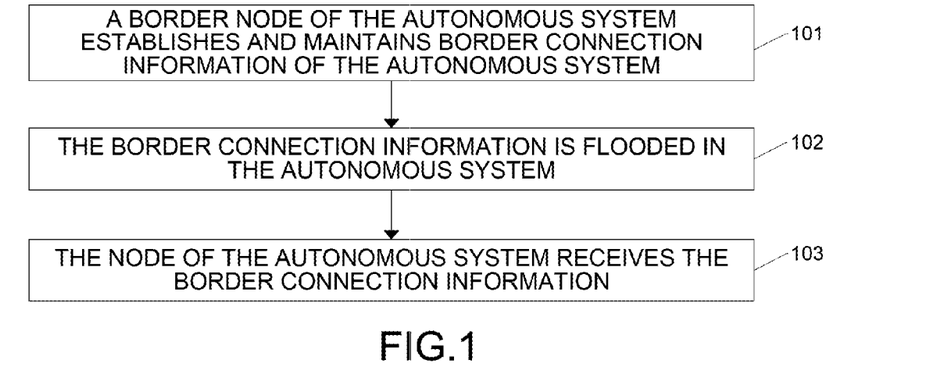
FIG. 1 illustrates a flow chart of a method for advertising border connection information of autonomous systems according an embodiment of the present invention.

Embodiments of the present invention provide a method for advertising border connection information of autonomous systems. FIG. 1 illustrates a flow chart of a method for advertising border connection information of autonomous systems according an embodiment of the present invention. The method includes:

Step 101: A border node of the autonomous system establishes and maintains the border connection information of the autonomous system.

Step 102: The border connection information is flooded in the autonomous system;

Step 103: The node of the autonomous system receives the border connection information.

The method for advertising border connection information of autonomous system usually is applied in a large network including a plurality of autonomous systems. The autonomous system for implementing the method of embodiments of the present invention at least includes two nodes connected with each other, at least one of which is a border node for establishing neighbor connection with an external neighbor autonomous system, and the other one(s) of which may be an internal node responsible for forwarding message within the autonomous system or may be another border node for establishing neighbor connection with an external neighbor autonomous system. In an embodiment of the present invention, the autonomous system includes a plurality of border nodes and internal nodes. The border nodes and the internal nodes may be in relationship of one-to-one connection, or may be in relationship of one-to-multiple or multiple-to-multiple connection. In addition, the border nodes and the internal nodes may employ router or other network device with routing function.

In the method for advertising border connection information of autonomous system according to an embodiment of the present invention, the node of the autonomous system may support ISIS protocol or OSPF protocol. Solutions of embodiments of the present invention may be discussed in detail below by referring to embodiments.

Embodiment 1

In this embodiment, description is given by referring to router acting as the node of autonomous system. In the case that a router of autonomous system supports ISIS protocol, the method for advertising border connection information of autonomous system as illustrated in FIG. 1 is detailed as follows.

Step 101: A border router of the autonomous system establishes and maintains the border connection information of the autonomous system.

The border connection information in step 101 may be obtained via Border Gateway Protocol (BGP). The process of establishing and maintaining the border connection information of the autonomous system may be: establishing corresponding border connection information when the border router establishes connection with a neighbor border router of an external neighbor autonomous system; and deleting the corresponding border connection information in the case of disconnection between the border router and the neighbor border router of the external neighbor autonomous system.

Alternatively, the border connection information in step 101 may be obtained via static and manual configuration. In this case, the process of establishing and maintaining the border connection information of the autonomous system may be: receiving, by the border router, a manual input from a user, and establishing corresponding border connection information when a link between the border router and the neighbor border router of the external neighbor autonomous system is available; and deleting the corresponding border connection information when the link between the border router and the neighbor border router of the external neighbor autonomous system is unavailable.

The border connection information includes an identifier of the neighbor border router in the neighbor autonomous system (Router_ID) and number of the neighbor autonomous system (AS Number).

Step 102: The border router internally floods the border connection information within the autonomous system.

Because the border router supports ISIS protocol, the embodiment of the present invention defines an autonomous system border connection description Sub-TLV (ASBR Connection Descriptor Sub-TLV) field for carrying the border connection information of the autonomous system and internally advertising within the autonomous system. The border connection information may be included in a value field of one border connection description Sub-TLV field, and Router_ID and AS Number in the border connection information may be included in two value fields of the border connection description Sub-TLV field, respectively. The Router_ID may be represented with 4 or 16 bytes, and the AS Number may be represented with 4 bytes.

The border connection description Sub-TLV (ASBR Connection Descriptor Sub-TLV) field may be included in a Type-Length-Value (TLV) field in Link State Protocol Data Unit (PDU) (LSP) packet. Multiple types of TLV fields included in the LSP message are defined in ISIS protocol, such as ISIS Router Capability TLV field, Intermediate System (IS) Reachability TLV field, Internet Protocol (IP) Reachability TLV field, and Inter-AS Reachability TLV field. The above TLV fields include one or more length-variable Sub-TLV fields, while the sum of the lengths of all Sub-TLV may not exceed 250 bytes, all of the Sub-TLV fields are extensible. A field for identifying flood range and flood direction is defined in the TLV fields, with the field for identifying flood range and flood direction carrying a value 1, flooding may be performed in the whole autonomous system, or with the field for identifying flood range and flood direction carrying a value 2, flooding may be performed in a route area. The route area refers to level in an autonomous system supporting the ISIS protocol.

By use of newly-defined border connection description Sub-TLV field, the step 102 of the border router supporting ISIS protocol internally flooding the border connection information within the autonomous system may be: the border router has the border connection information included in the border connection description Sub-TLV field, and has the border connection description Sub-TLV field included in the TLV field, and has the TLV field included in the LSP message, and floods the ISP message. And, the border router saves the LSP message to be flooded.

When the border connection information changes, the border router may update the corresponding border connection description Sub-TLV field duly, and flood the border connection information carried in the saved corresponding LSP message after the LSP message is refreshed.

After the border router floods the LSP message for the first time, it may not save the flooded LSP message. As such, when the border connection information changes, the border router may re-generate an LSP message carrying updated border connection information, and flood the re-generated LSP message.

In step 102, in general, the border connection information carried in the TLV field of the ISP message may be flooded in a whole autonomous system. In some cases, however, such as in the case where all border routers and all PCEs that need to obtain the border connection information are located in the same level, because all the routers except the PCEs do not need to obtain the border connection information, the user may configure as required to have the information being flooded only in the level where all border routers and all PCEs are located. The method for configuration is to use the field for identifying flood range and flood direction, and limit the flood range of the TLV field within the level where all border routers and all PCEs are located.

Step 103: The router of the autonomous system receives the border connection information.

The user may configure the router of the autonomous system as required. When the LSP message is received by the router of the autonomous system, if the border connection information does not require to be carried in the LSP message, the message is forwarded without obtaining the information carried therein. For example, in a network scenario where the autonomous system includes one or more PCEs, the common internal router that does not need path calculation may only forward the LSP message upon the receipt of the LSP message carrying the border connection information, but the PCEs responsible for path calculation may obtain the border connection information from the LSP message upon the receipt thereof, in order to support the implementation of the path calculation.

Figure 2:
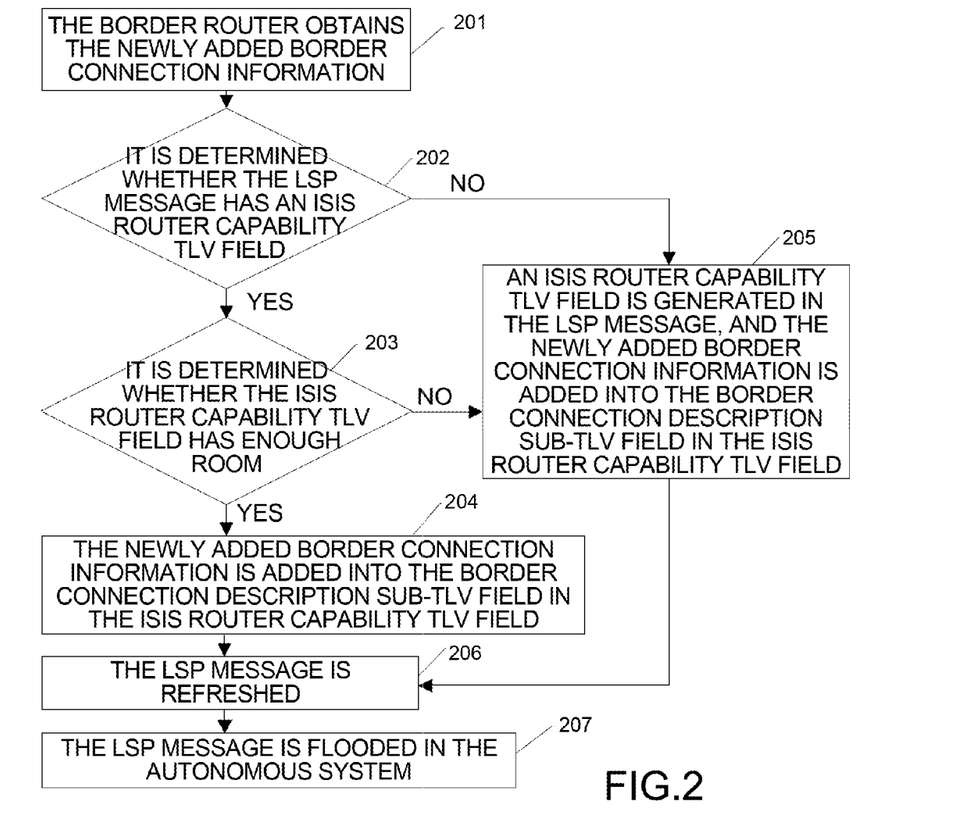
FIG. 2 illustrates a flow chart of a method for advertising border connection information of autonomous systems that supports ISIS protocol according an embodiment of the present invention, when the border connection information is newly added.

In the example that the border router of the autonomous system establishes neighbor connection with a border router in an external neighbor autonomous system according to BGP protocol, in step 102, in accordance with dynamic change of the border connection information, the advertising process by the border router to the LSP message can be generalized as the following three instances:

(1) When the border router established connection with one neighbor border router in the external neighbor autonomous system, the addition of a piece of border connection information may be advertised in the border router, and the border router may have the border connection information carried in an LSP message and flood to the present autonomous system. The specific progress is shown in FIG. 2, which illustrates a flow chart of a method for advertising border connection information of autonomous systems that supports ISIS protocol according an embodiment of the present invention, when the border connection information is newly added. The following steps are included:

Step 201: The border router obtains the newly added border connection information, which contains identifier of the neighbor border router and number of the neighbor autonomous system where the neighbor border route is located.

Step 202: It is determined whether the LSP message saved by the border router has an ISIS Router Capability TLV field; if yes, step 203 is executed; if not, step 205 is executed.

Step 203: It is determined whether the ISIS Router Capability TLV field has enough room available for the addition of the newly added border connection information; if yes, step 204 is executed; if not, step 205 is executed.

As sum of the lengths of all Sub-TLV fields in the ISIS Router Capability TLV field may not exceed 250 bytes, the specific determining manner in step 203 is: determining whether the sum of lengths of all Sub-TLV fields in the ISIS Router Capability TLV field may go beyond 250 bytes if the border connection information in step 201 is added in the ISIS Router Capability TLV field. If it may exceed 250 bytes, it is indicated that the ISIS Router Capability TLV field has no sufficient room for addition of the newly-added border connection information; otherwise, it is indicated that there is enough room.

Step 204: The newly added border connection information is added into the border connection description Sub-TLV field in the ISIS Router Capability TLV field, and the process proceeds to step 206.

There may be two manners for adding the border connection information: if the ISIS Router Capability TLV field includes the border connection description Sub-TLV field, the newly-added border connection information can be added into the existing border connection description Sub-TLV field in the ISIS Router Capability TLV field; if the ISIS Router Capability TLV field does not include border connection description Sub-TLV field, a border connection description Sub-TLV field may be created and the newly-added border connection information may be added into the created border connection description Sub-TLV field in the ISIS Router Capability TLV field.

Step 205: An ISIS Router Capability TLV field is generated in the LSP message, and the newly added border connection information is added into the border connection description Sub-TLV field in the created ISIS Router Capability TLV field, and the process proceeds to step 206.

Step 206: The LSP message is refreshed.

Step 207: The LSP message is flooded in the autonomous system.

Figure 3:
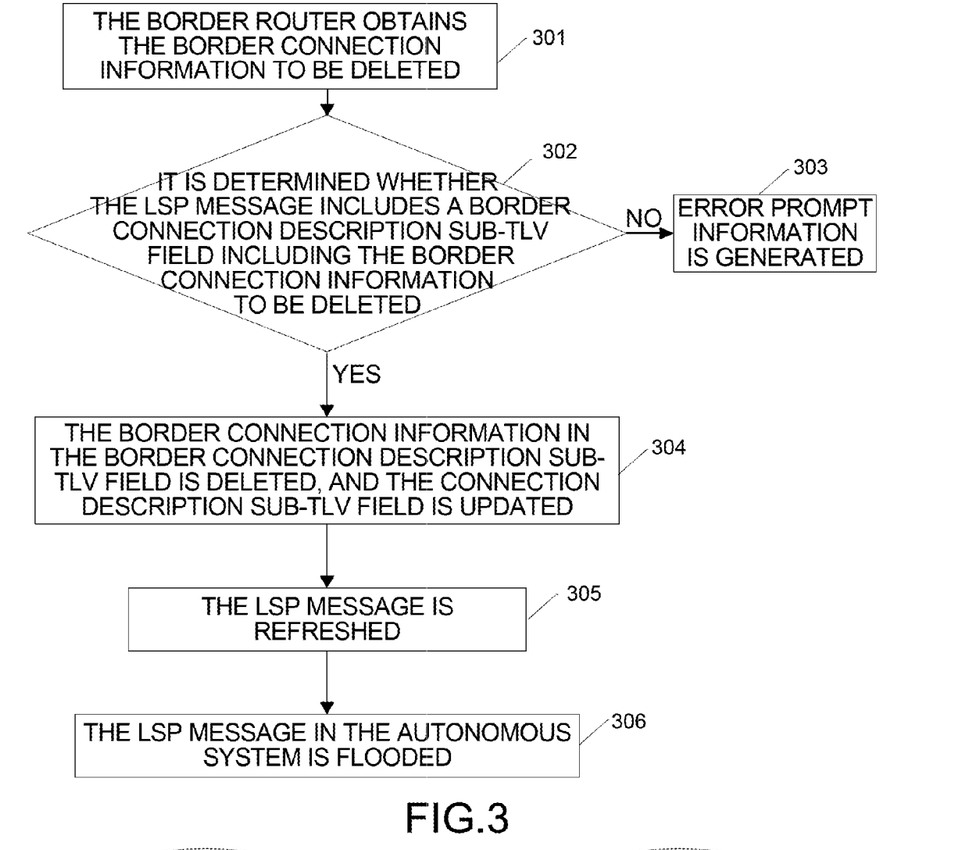
FIG. 3 illustrates a flow chart of a method for advertising border connection information of autonomous systems that supports ISIS protocol according an embodiment of the present invention, when the border connection information is deleted.

(2) When the border router disconnects with a neighbor border router in the external neighbor autonomous system, deletion of corresponding border connection information may be advertised in the border router to delete all corresponding border connection information, and the updated information in the SLP message may be flooded within the autonomous system after the LSP message is refreshed. The specific progress is shown in FIG. 3, which illustrates a flow chart of a method for advertising border connection information of autonomous systems that supports ISIS protocol according an embodiment of the present invention, when the border connection information is deleted. The following steps are included:

Step 301: The border router obtains the border connection information to be deleted.

Step 302: It is determined whether the ISIS Router Capability TLV field of the LSP message saved by the border router includes a border connection description Sub-TLV field including the border connection information to be deleted; if not, step 303 is executed; if yes, step 304 is executed.

Step 303: Error prompt information is generated, and current flow is terminated.

Step 304: The border connection information in the border connection description Sub-TLV field is deleted, and the border connection description Sub-TLV field is updated.

Step 305: The LSP message including the border connection description Sub-TLV field is refreshed.

Step 306: The LSP message is internally flooded within the autonomous system.

(3) When BGP protocol of the border router is deleted or all external connection relations is unavailable, deletion of all of the corresponding border connection information in the border router may be advertised to delete all corresponding border connection information, and the LSP message after update accordingly may be flooded, the specific progress of which is similar to the above circumstance (2). In addition, the LSP message carrying all border connection information may be found, the LSP message may be aged, and the border connection information carried in the aged LSP message may be flooded internally within the system.

The above embodiment takes the example that the Value field in the border connection description Sub-TLV field includes one or more border connection information. In other embodiments of the present invention, the Router_ID and AS Number in a border connection information may be included in Value fields in two different border connection description Sub-TLV fields, and these two border connection description Sub-TLV fields may be included in a TLV field, so that the corresponding between the Router_ID and the AS Number is capable to be recognized. When the border connection information is deleted or added, the Router_ID and AS Number in the border connection information requires to be added or deleted in the two border connection description Sub-TLV fields.

Besides, the above embodiment takes the example that the border connection description Sub-TLV field is included in the ISIS Router Capability TLV field. In other embodiments of the present invention, the border connection description Sub-TLV field may be included in other types of TLV field, such as IS accessibility TLV field, IP accessibility TLV field, Inter-AS accessibility TLV field, etc.

After step 103, the router of the autonomous system can establish and maintain a border connection information table in local in accordance with the border connection information received in step 103.

When the autonomous system includes a plurality of border routers and a plurality of internal routers, if the internal routers fail to receive updated message from the border routers due to reasons such as disconnection of the links between the internal routers and the border routers or disconnection of the links between the internal routers, the internal routers may delete all border connection information concerned in the local border connection information table, while the LSP message received previously and carrying the border connection information may be aged, and the border connection information carried in the aged LSP message may be flooded.

In addition to the above circumstances, the maintenance of the border connection information table by the internal router approximately involves the following three circumstances:

(1) When a valid LSP message is received, which contains a border connection description Sub-TLV field carrying border connection information; the border connection information table may be updated based on the border connection information carried in the LSP message.

(2) When an aged LSP message is received, which contains a border connection description Sub-TLV field carrying border connection information; the border connection information in the border connection information table may be deleted accordingly based on the border connection information carried in the LSP message.

(3) When ISIS protocol is deleted, the internal router may delete the entire border connection information table.

The border connection information table established in accordance with the embodiments of the present invention may be a link list with various patterns. In the embodiments of the present invention, the border connection information table usually takes AS numbers of external neighbor autonomous systems connected with the autonomous system as index. The number of each external neighbor autonomous system corresponds to one or more neighbor border router identifiers, and each neighbor border router identifier corresponds to one or more neighbor router identifier. Here, the border router refers to border router of the autonomous system, and the neighbor border router is the border router of the external neighbor autonomous system connected to the border router of the autonomous system.

Figure 4:
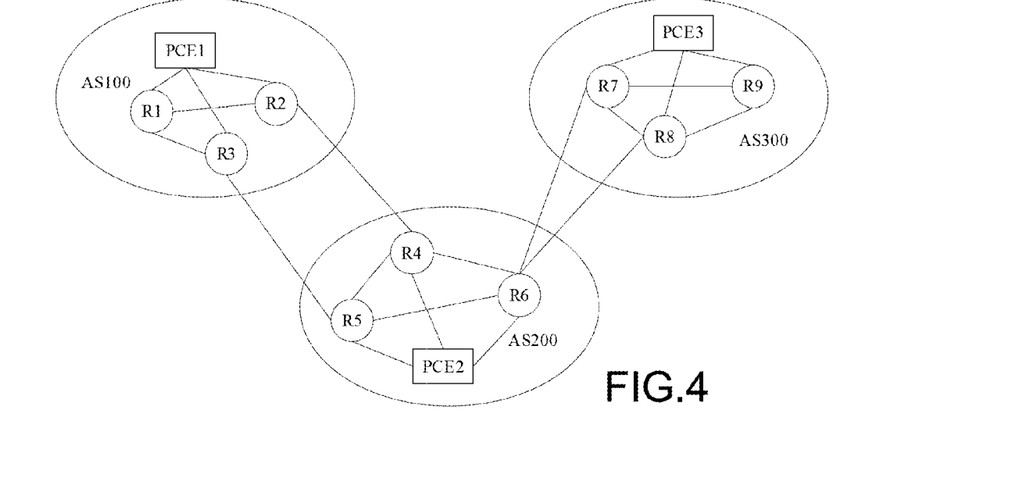
FIG. 4 illustrates network scenario for applying the method for advertising border connection information of autonomous systems according to an embodiment of the present invention.
Figure 5:
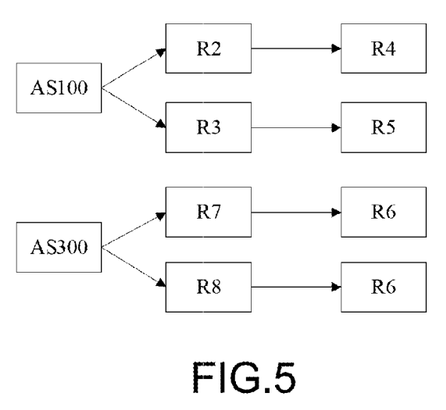
FIG. 5 illustrates a table of border connection information established by applying the method for advertising border connection information of autonomous systems according to an embodiment of the present invention in the network scenario shown in FIG. 4.

For clarifying the method of embodiments of the present invention, a specific application example may be introduced below, in which a border router utilizes the method of embodiments of the present invention to advertise border connection information in the system located therein and establish a border connection information table in a router internal to the system. As shown in FIG. 4, FIG. 4 illustrates network scenario for applying the method for advertising border connection information of autonomous systems according to an embodiment of the present invention. The method of embodiments of the present invention is applied in a network scenario of PCE model, which includes three autonomous systems connected in sequence, which are defined as AS100, AS200, and AS300. The autonomous system AS200 includes three border routers R4, R5 and R6 connected to one another and a internal path calculating element PCE2 that connects with the three border routers, in which the border router R4 connects to a border router R2 in the external neighbor autonomous system AS100, the border router R5 connects to a border router R3 in the external neighbor autonomous system AS100, and the border router R6 connects to border routers R7 and R8 in the external neighbor autonomous system AS300. When the path calculating element PCE 2 needs to get knowledge of border connection information of the autonomous system AS200 where it is located for path calculation, the three routers R4, R5 and R6 in the autonomous system AS200 may establish and maintain their border connection information, respectively, and make the border connection information being carried in LSP messages for being internally flooded within the autonomous system. The path calculating element PCE 2 receives the border connection information of the three border routers, and establishes a border connection information table in local. The border connection table is illustrated as FIG. 5. FIG. 5 illustrates a table of border connection information established by applying the method for advertising border connection information of autonomous systems according to an embodiment of the present invention in the network scenario shown in FIG. 4. FIG. 5 is a link list that takes numbers of the neighbor autonomous systems as index and includes identifiers of border routers of the present autonomous systems and identifiers of neighbor border routers of neighbor autonomous systems connected thereto. In addition, in the present embodiment, each of the three border routers R4, R5 and R6 may receive the border connection information from the other two border routers, and establish the border connection information table as shown in FIG. 5 in local.

When the connection between the border router R6 in autonomous system AS200 and the border router R8 in autonomous system AS300 is unavailable, the border router R6 may advertise to delete the border connection information that contains the number of the autonomous system AS300 and the identifier of the border router R8, find the saved corresponding LSP message, delete two tuples information includes the AS number 300 and the identifier of the border router R8 in the border connection description Sub-TLV field of the LSP message, and then internally flood updated information carried in LSP message within the autonomous system after the LSP message is refreshed, so as to have all of the routers in the autonomous system AS200 to be capable of updating the border connection information table established in local timely.

When the link between the path calculating element PCE 2 and the border router R4 goes wrong to have the PCE 2 being unable to receive the periodically updated border connection information transmitted by the border router R4, the PCE 2 may delete all border connection information in relation to the border router R4 in local border connection information table, while an aged LSP message may be generated and the border connection information carried in the aged message may be flooded internally within the system.

Embodiment 2

In this embodiment, routers in the autonomous system support OSPF protocol. Hereinafter, the routers of the autonomous system supporting OSPF protocol are taken as an example for introducing the method for advertising border connection information of autonomous system as shown in FIG. 1 in detail.

Step 101: A border router of an autonomous system establishes and maintains border connection information of the autonomous system. This step is identical to step 101 in Embodiment 1, which thereby may be omitted for brevity.

Step 102: The border router floods the border connection information in the autonomous system.

In OSPF protocol, a Link TLV field is defined. In the embodiments of the present invention, the border connection information may be included in the Link TLV field with three specific manners for the including:

Manner 1: The border connection information is included in a Value field in a border connection description Sub-TLV field, and the border connection description Sub-TLV field is included in the Link TLV field.

Manner 2: Router_ID and AS Number in the border connection information are included Value fields of two different border connection description Sub-TLV fields respectively, and the two different border connection description Sub-TLV fields are included in the Link TLV field.

Manner 3: The Router_ID in the border connection information is included in the Value field in a Link ID Sub-TLV field that has been defined in OSPF protocol, the AS Number in the border connection information is included in the Value field of the border connection description Sub-TLV field, and both of the Link ID Sub-TLV and the border connection description Sub-TLV are included in the Link TLV field.

In particular, the Router_ID may be represented with 4 or 16 bytes, and the AS Number may be represented with 4 bytes.

Subsequently, the Link TLV filed may be included in a Link State Advertisement (LSA) message, and the LSA message may be flooded. The OSPF protocol defines various kinds of LSA message, such as Router Information (RI) LSA message, Opaque LSA message, etc. Such an LSA message may include one or more Link TLV fields.

In this embodiment, the border connection information may be controlled to be flooded within the entire autonomous system or within a certain route area. The control method is identical to the method in Embodiment 1. The router area refers to an autonomous domain in an autonomous system that supports OSPF protocol.

When the border connection information varies, the border router may update corresponding Link TLV field in time, and flood the border connection information carried in corresponding LSA message stored thereby after the LSA message is refreshed.

Similar to Embodiment 1, after the border router floods the LSA message for the first time, the flooded LSA message may not be saved. As such, the border router may regenerate an LSA message that contains updated border connection information and flood the re-generated LSA message, when the border connection information varies.

Figure 6:
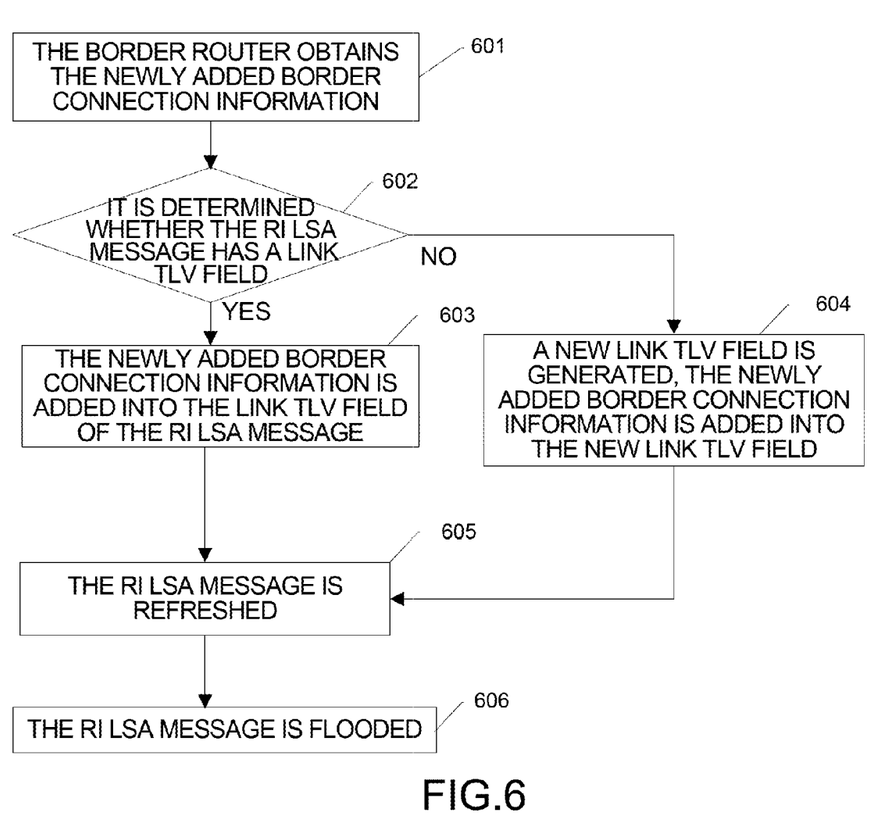
FIG. 6 illustrates a flow chart of a method for advertising border connection information of autonomous systems that supports OSPF protocol according an embodiment of the present invention, when the border connection information is newly added.

In the example that the border router of the autonomous system establishes neighbor connection with the border router in an external neighbor autonomous system, in step 102, the advertising process to the LSA message by the border router based on dynamic change of the border connection information may be generalized as the following three circumstances:

(1) When the border router establishes connection with a border router in an external neighbor autonomous system, addition of a piece of border connection information may be advertised in the border router, while the border router may internally flood an RI LSA message that carries the border connection information within the present system, the specific progress of which is shown in FIG. 6. FIG. 6 illustrates a flow chart of a method for advertising border connection information of autonomous systems that supports OSPF protocol according an embodiment of the present invention, when the border connection information is newly added. The following steps are included:

Step 601: The border router obtains the newly added border connection information, which comprises an identifier of the neighbor border router and number of the neighbor autonomous system.

Step 602: It is determined whether the RI LSA message saved by the border router has a Link TLV field; if yes, step 603 is executed; if not, step 604 is executed.

Step 603: The newly added border connection information is added into the Link TLV field of the RI LSA message. The specific manners thereof are described in step 102, which thereby is omitted for brevity. Step 605 is executed sequentially.

Step 604: A new Link TLV field is generated, the newly added border connection information is added into the new Link TLV field, and then the process proceeds to step 605.

Step 605: The RI LSA message is refreshed.

Step 606: The RI LSA message that carries the newly added border connection information is internally flooded within the autonomous system.

Figure 7:
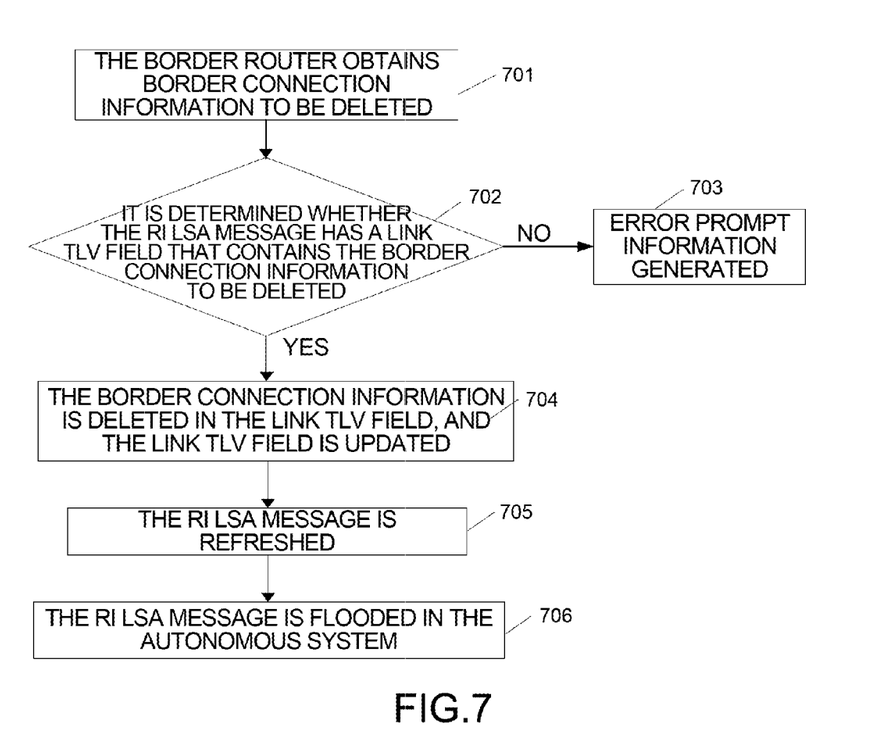
FIG. 7 illustrates a flow chart of a method for advertising border connection information of autonomous systems that supports OSPF protocol according an embodiment of the present invention, when the border connection information is deleted.

(2) When the border router disconnects with a neighbor border router in an external neighbor autonomous system, deletion of all of the corresponding border connection information in the border router may be advertised to delete all corresponding border connection information, and corresponding RI LSA message may be internally flooded within the system after the LSA message is updated, the specific progress of which is shown in FIG. 7. FIG. 7 illustrates a flow chart of a method for advertising border connection information of autonomous systems that supports OSPF protocol according an embodiment of the present invention, when the border connection information is deleted. The following steps are included:

Step 701: The border router obtains border connection information to be deleted.

Step 702: It is determined whether the RI LSA message saved by the border router has a Link TLV field that contains the border connection information to be deleted; if not, Step 703 is executed; if yes, step 704 is executed.

Step 703: Error prompt information is generated, and current flow is terminated.

Step 704: The border connection information in the Link TLV field is deleted, and the Link TLV field is updated.

Step 705: The RI LSA message carrying the Link TLV field is refreshed.

Step 706: The RI LSA message is flooded within the autonomous system.

(3) When BGP protocol of the border router is deleted or all external connection are unavailable deletion of all corresponding border connection information may be advertised in the border router to delete all corresponding border connection information, and a corresponding RI LSA message may be internally flooded within the system after the RI LSA message is updated, the specific progress of which is similar to the above circumstance (2). Moreover, an RI LSA message that includes all border connection information may be found, the RI LSA message may be aged and then flooded within the system.

The above embodiment takes the example that the Link TLV field is included in the RI LSA message. In other embodiments of the present invention, the Link TLV field may be included in other types of LSA message, such as an Opaque LSA.

In this embodiment, the LSA message may be flooded in one route area of the autonomous system, i.e. an autonomous area.

Step 103: The router of the autonomous system receives the border connection information. This step is identical to step 103 in Embodiment 1, which is omitted for brevity.

Following step 103, the router of the autonomous system may locally establish and maintain a border connection information table based on the border connection information received in step 103. The specific method for establishing the border connection information table is identical to Embodiment 1, which is omitted here for brevity.

Figure 8:
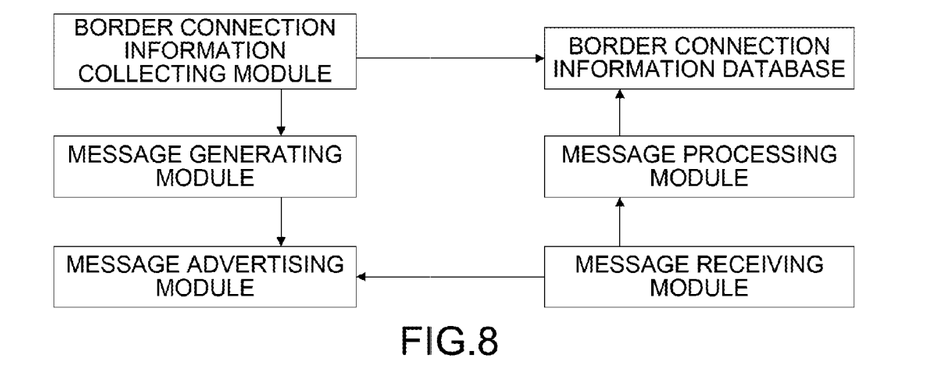
FIG. 8 illustrates a border node for advertising border connection information of autonomous systems according to an embodiment of the present invention.

The embodiment of the present invention further provides a border node that applies the method to advertise border connection information of autonomous system, as shown in FIG. 8. FIG. 8 illustrates a border node for advertising border connection information of autonomous systems according an embodiment of the present invention.

The border node mainly includes:

a border connection information collecting module, configured to obtain border connection information established by the border node;

a border connection information database, configured to store the border connection information of the autonomous system, which comprises the border connection information established by the border node;

a message generating module, configured to package the border connection information established by the border node into a message; and a message advertising module, configured to internally flood the message formed in the message generating module within the autonomous system.

The border node may further include:

a message receiving module, configured to receive messages transmitted by other border nodes within the autonomous system; and a message processing module, configured to parse the message received by the message receiving module, obtain the border connection information of the autonomous system from the message, and store the obtained border connection information in the border connection information database.

The message advertising module may be further configured to forward and advertise the message received by the message receiving module.

The method and border node for advertising border connection information of autonomous system provided by the embodiments of the present invention makes the border connection information of the autonomous system carried in an LSP message or an LSA message to dynamically advertise within the system via the manner of flooding, which can adapt to dynamic change of network topology, update the border connection information obtained by nodes within the system in time, support TE path calculation between autonomous systems efficiently, implement optimization of performance of an entire network, and may solve the problems such as high workload, time consuming, error prone, etc. that occur when current static and manual configuration technology is used for the configuration of the border connection information, so as to increase quality of service of the network, reduce the maintenance cost of the network and adapt to a large network architecture that includes a plurality of autonomous systems.

The above are exemplary embodiments of the present invention, and any common variation and substitute by one skilled in the art within the solution of embodiments of the present invention shall be within the protection scope of embodiments of the present invention.

What is claimed is:

1. A method for advertising border connection information of an autonomous system, comprising:

establishing and maintaining, by a border node of the autonomous system, border connection information of the autonomous system, wherein the border node of the autonomous system supports Open Shortest Path First (OSPF) protocol, and the border connection information comprises an identifier of a neighbor border node of a neighbor autonomous system and a number of the neighbor autonomous system;

flooding, by the border node of the autonomous system, the number of the neighbor autonomous system within the autonomous system;

flooding, by the border node of the autonomous system, the identifier of the neighbor border node of the neighbor autonomous system within the autonomous system; and receiving, by a node of the autonomous system, the number of the neighbor autonomous system and the identifier of the neighbor border node of the neighbor autonomous system, wherein the node of the autonomous system supports the OSPF protocol, wherein the number of the neighbor autonomous system and the identifier of the neighbor border node of the neighbor autonomous system are included in value fields of two different border connection description sub-type-length-value (TLV) fields respectively, and each of the two border connection description sub-TLV fields is included in a Link TLV field of a Link State Advertisement (LSA) message, and wherein when border connection information is added on the border node, the process of flooding the number of the neighbor autonomous system and the identifier of the neighbor border node of the neighbor autonomous system of the border connection information within the autonomous system comprises:

determining whether the LSA message comprises a Link TLV field available for adding the border connection information;

if the LSA message comprises a Link TLV field, adding the border connection information in the Link TLV field, refreshing the LSA message, and flooding the refreshed LSA message; and if the LSA message does not comprise a Link TLV field, creating a new Link TLV field, including the added border connection information in the new Link TLV field, refreshing the LSA message, and flooding the refreshed LSA message.

2. The method of claim 1, wherein the border connection information to be established and maintained is obtained via border gateway protocol (BGP) or static manual configuration and saved in the border node.

3. The method of claim 2, wherein when the border connection information is obtained via BGP, the process of establishing and maintaining the border connection information comprises:

establishing and maintaining corresponding border connection information, when the border node establishes connection with the neighbor border node of the neighbor autonomous system; and deleting the corresponding border connection information from all border connection information saved by itself, when the connection established between the border node and the neighbor border node of the neighbor autonomous system disconnects;

when the border connection information is obtained via the static and manual configuration, the process of establishing and maintaining the border connection information comprises:

receiving, by the border node, a manual input by a user;

establishing and maintaining corresponding border connection information, when a link between the border node and the neighbor border node of the neighbor autonomous system is available; and deleting the corresponding border connection information from the border connection information saved by itself, when the link between the border node and the neighbor border node of the neighbor autonomous system is unavailable.

4. The method of claim 1, wherein the border connection information further comprises an identifier of the border node of the autonomous system.

5. The method of claim 1, wherein the process of flooding the number of the neighbor autonomous system within the autonomous system comprises:

including the number of the neighbor autonomous system in the Link TLV field;

including the Link TLV field in the LSA message; and flooding the LSA message.

6. The method of claim 5, wherein the process of including the number of the neighbor autonomous system in the Link TLV field comprises:

including the number of the neighbor autonomous system in the value field of one of the border connection description sub-TLV fields, and including the border connection description sub-TLV field in the Link TLV field.

7. The method of claim 1, wherein the LSA message is a Router Information (RI) LSA message or an Opaque LSA message.

8. The method of claim 1, wherein the process of flooding in the autonomous system comprises: flooding the number of the neighbor autonomous system and the identifier of the neighbor border node of the neighbor autonomous system of the border connection information in one route area of the autonomous system by utilizing a field for identifying flood range and flood direction.

9. The method of claim 1, wherein after the node of the autonomous system receiving the number of the neighbor autonomous system and the identifier of the neighbor border node of the neighbor autonomous system of the border connection information, the method further comprises: establishing and maintaining, by the node of the autonomous system, a border connection information table according to the obtained border connection information.

10. The method of claim 9, wherein the border connection information table takes a number of a neighbor autonomous system as an index, the number of each neighbor autonomous system corresponds to identifiers of one or more neighbor border nodes, and each of the identifiers of the neighbor border nodes corresponds to identifiers of one or more border nodes.

11. The method of claim 9, further comprising: updating the border connection information table based on the border connection information in the LSA message, when the LSA message received by the node of the autonomous system is a valid message.

12. The method of claim 9, further comprising: deleting corresponding border connection information in the border connection information table based on the border connection information carried in the LSA message, when the LSA message received by the node of the autonomous system is an aged message.

13. The method of claim 9, further comprising: deleting, by the node of the autonomous system, the border connection information table, when the OSPF protocol in the node of the autonomous system is deleted.

14. A method for advertising border connection information of an autonomous system, comprising establishing and maintaining, by a border node of the autonomous system, border connection information of the autonomous system, wherein the border node of the autonomous system supports Open Shortest Path First (OSPF) protocol, and the border connection information comprises an identifier of a neighbor border node of a neighbor autonomous system and a number of the neighbor autonomous system;

flooding, by the border node of the autonomous system, the number of the neighbor autonomous system within the autonomous system;

flooding, by the border node of the autonomous system, the identifier of the neighbor border node of the neighbor autonomous system within the autonomous system; and receiving, by a node of the autonomous system, the number of the neighbor autonomous system and the identifier of the neighbor border node of the neighbor autonomous system, wherein the node of the autonomous system supports the OSPF protocol, wherein the number of the neighbor autonomous system and the identifier of the neighbor border node of the neighbor autonomous system are included in value fields of two different border connection description sub-type-length-value (TLV) fields respectively, and each of the two border connection description sub-TLV fields is included in a Link TLV field of a Link State Advertisement (LSA) message, and wherein when border connection information is deleted on the border node, flooding the number of the neighbor autonomous system and the identifier of the neighbor border node of the neighbor autonomous system of the border connection information within the autonomous system comprises:

determining whether the LSA message carries the border connection information to be deleted;

if the LSA message carries the border connection information to be deleted, deleting the corresponding border connection information in the Link TLV field, refreshing the LSA message, and flooding the refreshed LSA message.

15. A method for advertising border connection information of an autonomous system, comprising:

establishing and maintaining, by a border node of the autonomous system, border connection information of the autonomous system, wherein the border node of the autonomous system supports Open Shortest Path First (OSPF) protocol, and the border connection information comprises an identifier of a neighbor border node of a neighbor autonomous system and a number of the neighbor autonomous system;

flooding, by the border node of the autonomous system, the number of the neighbor autonomous system within the autonomous system;

flooding, by the border node of the autonomous system, the identifier of the neighbor border node of the neighbor autonomous system within the autonomous system; and receiving, by a node of the autonomous system, the number of the neighbor autonomous system and the identifier of the neighbor border node of the neighbor autonomous system, wherein the node of the autonomous system supports the OSPF protocol, wherein the number of the neighbor autonomous system and the identifier of the neighbor border node of the neighbor autonomous system are included in value fields of two different border connection description sub-type-length-value (TLV) fields respectively, and each of the two border connection description sub-TLV fields is included in a Link TLV field of a Link State Advertisement (LSA) message, and wherein when border connection information is deleted on the border node, the process of flooding the number of the neighbor autonomous system and the identifier of the neighbor border node of the neighbor autonomous system of the border connection information within the autonomous system comprises: searching an LSA message that contains all border connection information to be deleted, aging the LSA message, and internally flooding the aged LSA message within the autonomous system.

* * * * *

UNITED STATES PATENT AND TRADEMARK OFFICE
CERTIFICATE OF CORRECTION

PATENT NO. : 8,270,317 B2  
APPLICATION NO. : 12/463218  
DATED : September 18, 2012  
INVENTOR(S) : Hongmaio Xia et al.

Page 1 of 1

It is certified that error appears in the above-identified patent and that said Letters Patent is hereby corrected as shown below:

On Title Page 2, item 56, the FOREIGN PATENT DOCUMENTS section should read:

| CN | 1685675 A   | 10/2005 |
|----|-------------|---------|
| CN | 101179488 A | 5/2008  |
| WO | 03/049342 A2 | 6/2003 |
| WO | 2006060184 A2 | 6/2006 |
| WO | 2006071901  | 7/2006  |
| WO | 2006110357 A2 | 10/2006 |

Signed and Sealed this  
Ninth Day of April, 2013

Teresa Stanek Rea  
*Acting Director of the United States Patent and Trademark Office*